Aug. 4, 1959

J. A. HAUSMANN 2,897,661

CLUTCH CONTROL MECHANISM

Filed Jan. 23, 1957

Inventor:
Joseph A. Hausmann
Paul O. Pippel
Atty

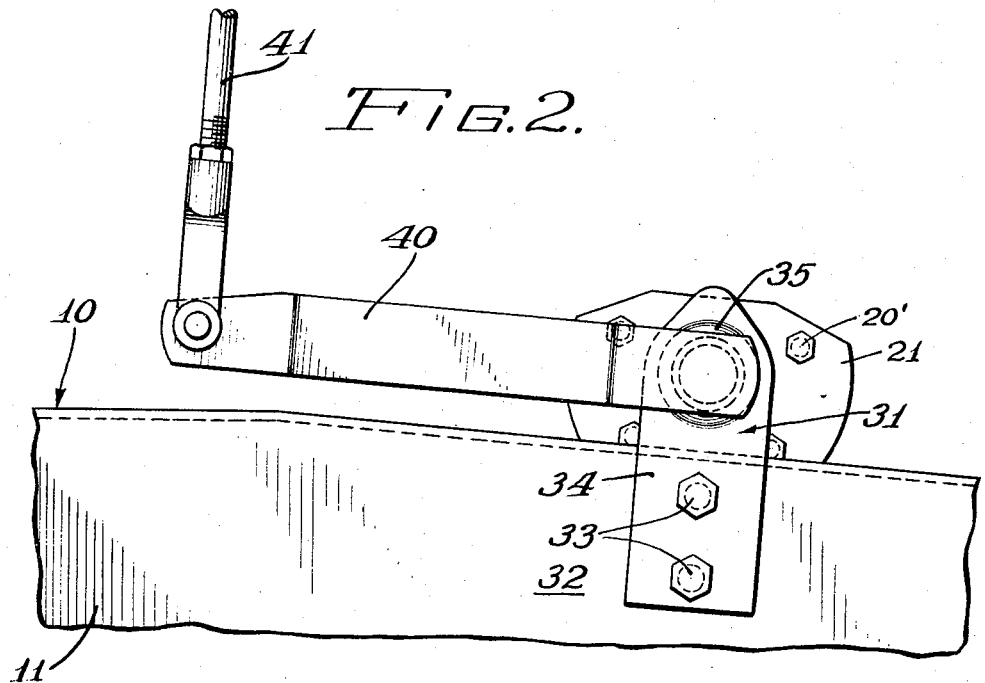
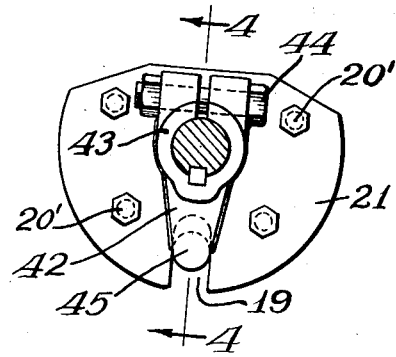
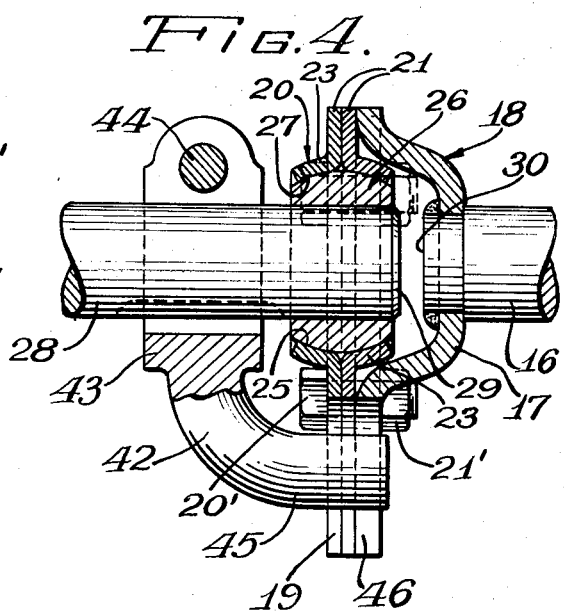

United States Patent Office 2,897,661
Patented Aug. 4, 1959

2,897,661

CLUTCH CONTROL MECHANISM

Joseph A. Hausmann, Fort Wayne, Ind., assignor to International Harvester Company, Chicago, Ill., a corporation of New Jersey Application January 23, 1957, Serial No. 635,711

6 Claims. (Cl. 64—10)

This invention relates to a clutch control mechanism and more particularly to a clutch actuating and disengaging mechanism for a resiliently mounted power plant such as is used in motor vehicles.

It has been the usual practice in motor vehicle design and construction to mount the power plant or engine resiliently or flexibly upon the supporting or chassis frame in order to avoid transmission of engine-developed vibration to the car body, by permitting the power plant to oscillate about a longitudinally extending axis and move fore and aft as well during operation of the same. The clutch housing as well as the transmission casing are generally secured to the engine and since the clutch control or pedal member is usually mounted transversely with respect to the axis of oscillation as well as a fore and aft movement of the power plant on the frame while the clutch throwout lever or disengaging member remains positioned within the clutch housing, the problem of transmitting control motion between the clutch pedal and throwout mechanism and yet permit a certain amount of relative movement between the members has received considerable attention in the industry. It is, therefore, a primary objective of the present invention to provide a novel, simple, inexpensive and highly effective clutch control construction whereby a resilient yet positive connection is maintained between the clutch pedal and clutch disengaging member that will accomplish a twofold objective of permitting a resiliently mounted power plant to freely oscillate and simultaneously therewith will move fore and aft along a longitudinal axis without transmitting such motions and the objectionable chatter resulting therefrom to the clutch pedal.

Another object of the invention is the provision of unique means interconnecting a clutch pedal actuated lever pivotally mounted for angular movement on a vehicle frame and a clutch throwout mechanism resiliently mounted with respect to the frame wherein positive control motion may be transmitted through the interconnecting means when the actuating force is applied to the clutch pedal in its ordinary mode of operation that will prevent the relative motion of the vehicle power plant and clutch from being transmitted to the clutch pedal actuated lever and hence to the clutch pedal.

A still further object is the provision of a novel connection between a control member mounted on the vehicle chassis frame and operable from within the vehicle body with a mechanism mounted on a resiliently mounted power plant which connection will not rattle or transmit vibration to the vehicle body and which at the same time will give constant and positive control of the mechanism mounted on the power plant.

The foregoing and other important objects and desirable features inherent in and encompassed by the invention together with many of the purposes and uses thereof will become readily apparent from a reading of the ensuing description in connection with the annexed drawings, in which:

Figure 2 is a side elevational view of the clutch control mechanism shown in Figure 1;

Figure 3 is a sectional view taken substantially along the line 3—3 of Figure 1; and Figure 4 is a sectional view taken substantially along line 4—4 of Figure 3.

Figure 1:
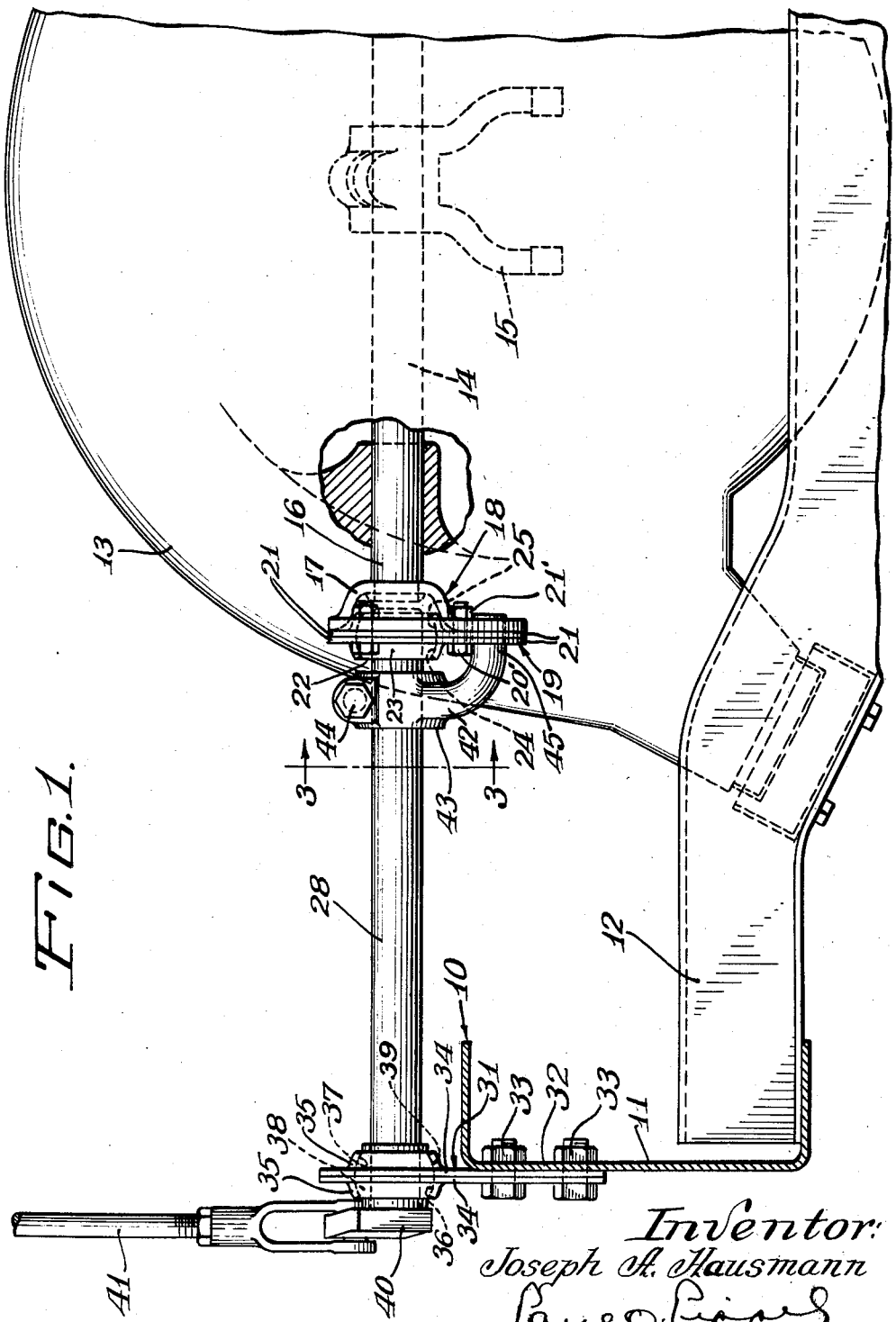
Figure 1 is a rear elevational view of a clutch control mechanism embodying the invention.

Referring to the drawings wherein like reference characters represent like elements throughout the various views, a vehicle chassis frame has been indicated generally by numeral 10. As in conventional motor vehicle chassis frames, the frame 10 includes a pair of channel shaped sill members 11, a portion of one being shown in Figures 1 and 2, which are rigidly interconnected by a plurality of cross members such as the one indicated at 12. A portion of the vehicle power plant or engine transmission casing and clutch housing which are all rigidly interconnected are shown somewhat diagrammatically and the outline thereof is indicated by numeral 13. The power unit including the engine, clutch and transmission is resiliently mounted on the cross member 12 and is similarly connected to other portions of the chassis frame 10 in accordance with conventional mounting practices. Since the mounting features form no specific part of the present invention, the details thereof have not been otherwise amplified in the drawings.

However, it is to be understood that the entire power unit 13 which includes the engine, transmission casing and clutch housing is free to rock about a longitudinally extending axis and may move forwardly and rearwardly relative to the chassis frame 10 as in conventional motor vehicle constructions.

A clutch release shaft 14 is journalled on the walls of the clutch housing and has clamped to its mid section the yoke or fork 15 which operates in the usual manner to engage or disengage the clutch mechanism. One end portion 16 of the transversely extending clutch release shaft 14 is disposed exteriorly of the clutch housing and extends through an aperture formed in a depressed portion 17 of a plate 18. The plate 18 is welded to the terminal end of the shaft 14 so as to be rotatable therewith. An elongated slot 19 is formed in the plate 18 which extends radially from the peripheral edge of the plate. It will be noted that because of the depressed portion 17, the portion of the plate 18 containing the slot 19 lies in a generally vertical plane axially spaced from the end of the clutch release shaft 16. A bearing retainer 20 is secured to the outwardly facing surface of the plate 18 by means of a plurality of bolts and nuts 20' and 21'. The bearing retainer 20 includes a pair of flat members 21 having substantially the same outer contour as the plate 18 which are placed back to back and welded together. Each plate is provided with an opening 22 therethrough which is in registration with the opening 22 of the other member 21. Each opening 22 is defined by an annular curved flange 23 such that when the members 21 are assembled together, the inner surfaces 24 of the curved flanges 23 form a semi-spherical bearing seat 25. A powdered metal oil impregnated bearing element 26 is disposed within the registering openings 22 of the members 21 and has a semi-spherical outer surface 27 which slidingly engages the semi-spherical seat 25 of the bearing retainer 20.

The innermost end of a clutch control shaft 28 extends through a central bore formed in the bearing element 26 and is adapted to be rotatably and slidably supported by the cylindrical surface defining the bore. The clutch control shaft 28 is normally in axial alignment with the clutch release shaft 14 and the innermost terminal end surface 29 is axially spaced from the outermost terminal end surface 30 of the clutch release shaft 14 as best shown in Figure 4. The outermost end of the clutch control shaft 28 extends through a bearing retainer 31 which is fastened to the web 32 of one of the side sill members 11 by means of a pair of bolts and nuts 33. The bearing retainer 31 like the bearing retainer 20 includes a pair of flat members 34 which are placed back-to-back when attached to the side sill member 11 and are each provided with an opening therethrough which is in registration with the opening of the other member 34 and each opening is defined by an annular curved flange 35 such that when the members 34 are assembled together the inner surfaces 36 of the curved flanges 35 form a semi-spherical bearing seat 37. A powdered metal, oil-impregnated bearing element 38 is suitably fixed to the shaft 28. The bearing element 38 has a semi-spherical outer surface 39 which slidingly engages the semi-spherical seat 37 of the bearing retainer 31. One end of an arm 40 is fixed to the outermost terminal end of the clutch operating shaft 28 and the opposite end of the arm is pivotally connected to a link 41 which is partially shown in Figures 1 and 2. The link 41, in turn, is operatively connected to a clutch control pedal (not shown) mounted in the operator's compartment whereby depression of the clutch pedal as in conventional installations causing the clutch control shaft 28 to rotate in a clutch disengaging direction.

In order to positively transmit rotational movement from the clutch control shaft 28 to the clutch operating shaft 14, a substantially L-shaped arm 42 is employed. One end of the arm 42 is provided with a split hub portion 43 which is mounted on the shaft 28 a short distance from the end of the shaft 28 disposed within the bearing retainer 19. A stub bolt and nut assembly 44 is used to draw tightly together the split portions of the hub so that the arm 42 is securely fixed to the shaft 28. The end 45 of the arm 42 opposite the hub portion 43 has a circular cross section as best illustrated in Figure 3, the longitudinal axis of the pin portion 45 of the crank 42 extends transversely and is spaced from and substantially parallel to the rotational axis of the shaft 28. The bearing retainer 20 is provided with an elongated slot 19 which extends radially from the peripheral edge of the bearing retainer 20 and is adapted to be in registration with the elongated slot 19 formed in the plate 18 when the plate and bearing retainer 20 are assembled together as hereinbefore described. The cylindrical end portion 45 of the crank 42 extends transversely through the registering slots 19, the longitudinal surfaces designated generally by numeral 46 defining the longitudinal sides of the slot 19 are substantially parallel with respect to each other and spaced a distance slightly greater than the diameter of the cylindrical end portion 45 such that the end portion 45 may freely slide in an axial direction with respect to rotational axis of the shaft 28. The end portion 45 is incapable of moving transversely with respect to the longitudinal axis of the slot 19. In other words the arm 42 and the plate 18 which is secured to the clutch release shaft 14 are positively coupled together for co-joint rotative movement but the connection between the plate 18 and the arm 42 permits clutch operating shaft 28 to move with respect to the clutch release shaft 16 in other directions.

In operation pressing down on the clutch pedal located in the operator's compartment by the vehicle operator will cause link 41 to be drawn upwardly as viewed in Figures 1 and 2 which upward movement causes the clutch operating shaft 28 to rotate in a clockwise direction as viewed in Figure 2. Because of the connection between the arm 42 and the plate 18 the clutch release shaft 14 is rotated in unison with the clutch operating shaft 28. Rotation of the clutch release shaft in a clockwise direction as viewed in Figure 2 in turn effects rocking of the fork member 15 to disengage the clutch mechanism.

Upon release of the clutch pedal by the vehicle operator the clutch pedal return spring, not shown, together with the conventional clutch springs located within the clutch housing will tend to rock shafts 14 and 28 in a counterclockwise direction as viewed in Figure 2 and such movement of the shafts will return the clutch pedal to its initial clutch engaged position.

Since the entire power unit 13 is resiliently mounted on the chassis frame 10 it will be understood that in accordance with well known principles that the speed of the engine or other vehicle varies is the result of clutch changes or otherwise, the engine may oscillate with a variable frequency about a longitudinal axis or may reciprocate in a fore and aft motion along the same axis. Such motion may occur independently or simultaneously and if transmitted to the clutch pedal will set up a vibration and/or chatter in the pedal that will not only be extremely annoying to the occupants of the vehicle, but will additionally cause excessive wear in all the associated linkage. In the present invention the transmission of such objectionable vibrations through the control mechanism is avoided by providing for the dissipation thereof before it reaches the clutch pedal in a manner hereinbefore explained. Not only are the vibrations effectively dissipated by the means interconnecting the clutch pedal and the clutch disengaging member or fork but such dissipation is accomplished without impairing the desired actuating movement of the clutch pedal which is transmitted to the clutch disengaging member. As an example movement of the power unit 13 to the left as viewed in Figure 1 relatively to the side sill member 11 shown therein is accommodated by sliding of the clutch operating shaft 28 in the cylindrical bearing of the bearing element 26. Such relative axial movement is permitted between the clutch operating shaft 28 and the clutch release shaft 14 even though rotational movement is being transmitted between the shafts. Since the unique connection between the shafts permits the positive transmission of torque even though the shafts are displaced axially with respect to their normal relationship. The clutch release shaft 14 may also pivot about an axis perpendicular to the plane of the paper as viewed in Figure 1 which axis intersects the axis of rotation of shaft 28 without disrupting the positive drive connection between the shaft 28 and the shaft 14. Such pivotal movement is accommodated by the semi-spherical character of the bearing element outer surface and the complemental semi-spherical seat of the bearing retainer 19.

The embodiment of the invention chosen for the purposes of illustration and description herein is that preferred for achieving the objects of the invention and developing the utility thereof in a most desirable manner due regard being had to existing factors of economy and simplicity of design and construction. It will be appreciated, therefore, that the particular structural and functional aspects emphasized herein are not intended to exclude but rather to suggest such other adaptations and modifications of the invention as in the spirit and scope of the invention as defined in the appended claims.

I claim:

1. A combination of a pair of relatively movable support structures; a first shaft; bearing means carried by one of said support structures for rotatably supporting one end of said first shaft, said bearing means permitting said first shaft to move angularly with respect to said support structure; a second shaft journalled in the other of said support structures; bearing means carried by said second shaft for supporting the end of said first shaft remote from that end rotatably supported by said one of said support structures, said bearing means permitting said first shaft to move angularly with respect to said second shaft; and means for interconnecting said first and second shafts whereby rocking movement of one of said shafts effects simultaneous rocking of the other of said shafts including a substantially L-shaped arm fixed to said first shaft, the free end portion of said arm having a longitudinal axis parallel and spaced from the longitudinal axis of said shaft, said second shaft having a substantially flat plate fixed thereto, said plate being disposed in a plane substantially perpendicular to the rotational axis of said second shaft and having an elongated slot extending from one edge thereof adapted to slidingly receive the free end portion of said arm.

2. A combination as substantially set forth in claim 1, in which, the free end portion of said arm received in the said slot is cylindrical, and the surfaces defining the longitudinal extending sides of said slot are spaced a distance substantially equal to the diameter of said free end portion of said arm received therein.

3. A combination of a relatively movable support structure; bearing means carried by one of said support structures; a first shaft having one end thereof journalled in said bearing means, said bearing means permitting relative angular movement between said shaft and said support structure carrying said bearing means; a second shaft journalled in the other of said support structures, said second shaft normally being in axial alignment with said first shaft; bearing means carried by said second shaft for supporting an end of said first shaft, said bearing means permitting axial and angular movements of said first shaft with respect to said second shaft; and means for interconnecting said first and second shafts whereby rotational movement of said first shaft effects simultaneous rotation of said second shaft including a substantially L-shaped arm fixed to said first shaft adjacent the end thereof remote from said bearing means carried by said one of said support structures, the longitudinal axis of the free end of said arm being spaced and parallel with respect to the longitudinal axis of said first shaft, a substantially flat plate fixed to said second shaft, said plate being disposed in plane substantially perpendicular to the rotational axis of said second shaft and having an elongated slot extending from one edge thereof adapted to slidingly receive the free end portion of said arm.

4. A combination substantially as set forth in claim 3, in which, the free end portion of said arm received in said slot is cylindrical, and the surfaces defining the longitudinally extending sides of said slot are spaced a distance substantially equal to the diameter of said free end portion of said arm received therein.

5. A combination of a pair of relatively movable support structures; semi-spherical bearing means carried by one of said support structures; first and second shafts arranged end-to-end and normally being in axial alignment with each other, said first shaft having an end portion thereof journalled in said bearing means, said bearing means permitting said first shaft to move angularly with respect to said one of said support structures, said second shaft being journalled in the other of said support structures; semispherical bearing means carried by the end of said second shaft for supporting the end of said first shaft adjacent thereto, said bearing means carried by said second shaft permitting angular and axial movement of said first shaft with respect to said second shaft; means for operatively interconnecting said first and second shafts whereby rotational movement of said first shaft effects simultaneous rotation of said second shaft including an L-shaped arm having one end thereof fixed to said first shaft adjacent the ends thereof adjacent the end of said second shaft, longitudinal axis of the free end of said arm being spaced parallel with respect to the longitudinal axis of said first shaft, a substantially flat plate fixed to an end of said second shaft, said plate being disposed in a plane substantially perpendicular to the rotational axis of said second shaft and having an elongated slot extending from one edge thereof adapted to slidingly receive the free end portion of said arm.

6. A combination substantially as set forth in claim 5, in which, the free end portion of said arm received in said slot is cylindrical, and the surfaces defining the longitudinally extending sides of said slot are spaced a distance substantially equal to the diameter of the free end portion of said arm received therein.

References Cited in the file of this patent

UNITED STATES PATENTS

| 2,247,463 | Allison | July 1, 1941 |
| 2,570,776 | Dehmel | Oct. 9, 1951 |
| 2,696,719 | Sklar | Dec. 14, 1954 |

FOREIGN PATENTS

| 841,247 | Germany | June 13, 1952 |